(12) United States Patent
Tripathi (10) Patent No.: US 7,945,647 B2
(45) Date of Patent: May 17, 2011

(54) METHOD AND SYSTEM FOR CREATING A VIRTUAL NETWORK PATH

(75) Inventor: Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 635 days.

(21) Appl. No.: 11/953,829

(22) Filed: Dec. 10, 2007

(65) Prior Publication Data

US 2009/0150521 A1    Jun. 11, 2009

(51) Int. Cl.
*G06F 15/177*    (2006.01)
(52) U.S. Cl. ........ 709/220; 709/205; 709/221; 709/222; 709/227; 709/230; 370/230; 370/235; 370/396; 370/397
(58) Field of Classification Search ................... 709/205, 709/220, 223–226; 370/397
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,771,595 B1 | 8/2004 | Gilbert et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,985,937 B1 | 1/2006 | Keshav et al. | |
| 7,046,665 B1 | 5/2006 | Walrand et al. | |
| 7,111,303 B2 * | 9/2006 | Macchiano et al. | .......... 719/313 |
| 7,146,431 B2 | 12/2006 | Hipp et al. | |

(Continued)

FOREIGN PATENT DOCUMENTS

WO    2005057318 A2    6/2005

(Continued)

OTHER PUBLICATIONS

Dovrolis, C., Thayer, B. and Ramanathan, P.: HIP: Hybrid Interrupt—Polling for the Network Interface:. ACM SIGOPS Operating Systems Review, vol. 35, Iss. 4, Oct. 2001, (11 Pages).

(Continued)

*Primary Examiner* — Yves Dalencourt
(74) *Attorney, Agent, or Firm* — Osha • Liang LLP (57) ABSTRACT

In general, the invention relates to a method for creating a virtual network path. The method includes instantiating a number of virtual network interface cards (VNICs) on a number of virtual machines, where each virtual machines is located in one of the computers, each of the computers is connected using a chassis interconnect, and the computers share a physical network interface. The method further includes populating a virtual switching table associated with the VNICs and implementing the virtual network path using the virtual switching table. The virtual network path includes a first virtual wire between a first VNIC and a second VNIC, wherein the first VNIC is located in a first computer and wherein the second VNIC is located in a second computer selected from the plurality of computers.

16 Claims, 6 Drawing Sheets

U.S. PATENT DOCUMENTS

| | | | |
|---|---|---|---|
| 7,177,311 | B1 | 2/2007 | Hussain et al. |
| 7,200,704 | B2 | 4/2007 | Njoku et al. |
| 7,260,102 | B2 | 8/2007 | Mehrvar et al. |
| 7,313,142 | B2 | 12/2007 | Matsuo et al. |
| 7,450,498 | B2 | 11/2008 | Golia et al. |
| 7,502,884 | B1 | 3/2009 | Shah et al. |
| 7,561,531 | B2 | 7/2009 | Lewites et al. |
| 7,620,955 | B1 | 11/2009 | Nelson |
| 7,633,955 | B1 | 12/2009 | Saraiya et al. |
| 7,688,838 | B1 | 3/2010 | Aloni et al. |
| 7,694,298 | B2 | 4/2010 | Goud et al. |
| 7,730,486 | B2 | 6/2010 | Herington |
| 2002/0052972 | A1 | 5/2002 | Yim |
| 2002/0080721 | A1 | 6/2002 | Tobagi et al. |
| 2003/0037154 | A1 | 2/2003 | Poggio et al. |
| 2003/0120772 | A1 | 6/2003 | Husain et al. |
| 2004/0015966 | A1 | 1/2004 | MacChiano et al. |
| 2004/0170127 | A1 | 9/2004 | Tanaka |
| 2004/0199808 | A1 | 10/2004 | Freimuth et al. |
| 2004/0202182 | A1 | 10/2004 | Lund et al. |
| 2004/0210623 | A1 | 10/2004 | Hydrie et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0182853 | A1 | 8/2005 | Lewites et al. |
| 2005/0251802 | A1 | 11/2005 | Bozek et al. |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0092928 | A1 | 5/2006 | Pike et al. |
| 2006/0174324 | A1 | 8/2006 | Zur et al. |
| 2006/0206300 | A1 | 9/2006 | Garg et al. |
| 2006/0206602 | A1 | 9/2006 | Hunter et al. |
| 2006/0233168 | A1 | 10/2006 | Lewites et al. |
| 2006/0236063 | A1 | 10/2006 | Hausauer et al. |
| 2006/0253619 | A1 | 11/2006 | Torudbakken et al. |
| 2007/0047536 | A1 | 3/2007 | Scherer et al. |
| 2007/0078988 | A1 | 4/2007 | Miloushev et al. |
| 2007/0083723 | A1 | 4/2007 | Dey et al. |
| 2007/0101323 | A1 | 5/2007 | Foley et al. |
| 2007/0244937 | A1 | 10/2007 | Flynn et al. |
| 2007/0244972 | A1* | 10/2007 | Fan .................. 709/205 |
| 2008/0002683 | A1 | 1/2008 | Droux et al. |
| 2008/0005748 | A1* | 1/2008 | Mathew et al. .......... 719/318 |
| 2008/0019365 | A1 | 1/2008 | Tripathi et al. |
| 2008/0022016 | A1 | 1/2008 | Tripathi et al. |
| 2008/0043765 | A1 | 2/2008 | Belgaied et al. |
| 2008/0144635 | A1* | 6/2008 | Carollo et al. ........... 370/397 |
| 2008/0171550 | A1 | 7/2008 | Zhao |
| 2008/0192648 | A1 | 8/2008 | Galles |
| 2008/0225875 | A1 | 9/2008 | Wray et al. |
| 2008/0239945 | A1 | 10/2008 | Gregg |
| 2008/0253379 | A1 | 10/2008 | Sasagawa |
| 2008/0270599 | A1 | 10/2008 | Tamir et al. |
| 2009/0006593 | A1 | 1/2009 | Cortes |
| 2009/0125752 | A1 | 5/2009 | Chan et al. |
| 2010/0046531 | A1 | 2/2010 | Louati et al. |

FOREIGN PATENT DOCUMENTS

| | | |
|---|---|---|
| WO | 2008093174 A1 | 8/2008 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Trapeze, Trapeze Overview, Jan. 1, 1998, USENIX, Retrieved from the Internet, <usenix.org/publications/library/proceedings/usenix98/full_papers/anderson/anderson_html/node4.html>, 2 pages.

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).

"I/O Virtualization Using Mellanox InfiniBand And Channel I/O Virtualization (CIOV) Technology"; XP-002541674; 2007; Retrieved from the Internet: <http://www.mellanox.com/pdf/whitepapers/WP_Virtualize_with_IB.pdf>, pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>; pp. 1-2 (2 pages).

Wheeler, B.; "10 Gigabit Ethernet In Servers: Benefits and Challenges"; XP-002541745; Jan. 2005; Retrieved from the Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (4 pages).

Written Opinion from PCT/US2009/048594 dated Sep. 7, 2009 (1 page).

Tripathi, S.; "Crossbow Architectural Document"; Nov. 21, 2006; 19 pages.

Nordmark; E.; "IP Instances—Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Office Action in United States Patent and Trademark Office of U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

Office Action in United States Patent and Trademark Office for U.S. Appl. No. 11/953,839, Mailed Aug. 19, 2010 (30 Pages).

Office Action in United States Patent and Trademark Office for U.S. Appl. No. 12/040,165, Mailed Feb. 8, 2010 (40 Pages).

Notice of Allowance in United States Patent and Trademark Office for U.S. Appl. No. 12/040,165, Mailed Oct. 29, 2010 (18 Pages).

Office Action in United States Patent and Trademark Office for U.S. Appl. No. 12/040,101, Mailed May 6, 2010 (39 Pages).

Office Action in United States Patent and Trademark Office for U.S. Appl. No. 11/953,842, Mailed Apr. 30, 2010 (39 Pages).

Final Office Action in United States Patent and Trademark Office for U.S. Appl. No. 11/953,842, Mailed Oct. 15, 2010 (32 Pages).

Office Action in United States Patent and Trademark Office for U.S. Appl. No. 12/040,105, Mailed Nov. 20, 2009 (93 Pages).

Final Office Action in United States Patent and Trademark Office for U.S. Appl. No. 12/040,105, Mailed May 26, 2010 (26 Pages).

Notice of Allowance in United States Patent and Trademark Office for U.S. Appl. No. 12/040,105, Mailed Oct. 5, 2010 (27 Pages).

Office Action in United States Patent and Trademark Office for U.S. Appl. No. 11/953,843, Mailed May 3, 2010 (169 Pages).

Final Office Action in United States Patent and Trademark Office for U.S. Appl. No. 11/953,843, Mailed Oct. 15, 2010 (33 Pages).

Office Action in United States Patent and Trademark Office for U.S. Appl. No. 12/053,666, Mailed Dec. 10, 2009 (36 Pages).
Final Office Action in United States Patent and Trademark Office for U.S. Appl. No. 12/053,666, Mailed Jun. 11, 2010 (27 Pages).
Notice of Allowance in United States Patent and Trademark Office for U.S. Appl. No. 12/053,666, Mailed Oct. 7, 2010 (15 Pages).
Office Action in United States Patent and Trademark Office for U.S. Appl. No. 12/053,676, Mailed Dec. 9, 2009 (41 Pages).
Notice of Allowance in United States Patent and Trademark Office for U.S. Appl. No. 12/053,676, Mailed Jul. 15, 2010 (20 Pages).
Final Office Action in United States Patent and Trademark Office for U.S. Appl. No. 12/040,101, Mailed Dec. 13, 2010 (25 Pages).
Kumar, R., ASI and PCI Express: Complementary Solutions, Dec. 2004, RTC Magazine, Retrieved from the Internet <rtcmagazine.com/articles/view/100274>, (5 pages).
Martinez, R., Alfaro, F.J., and Sanchez, J.L., Provising Quality of Service Over Advanced Switching, 2006, IEEE, Retrieved from the Internet, <ieeexplore.ieee.org/xpls/abs_all.jsp?arnumber=1655667&tag=1>, 10 pages.
Apani, Brave New World, Feb. 1, 2007, iSmile, Retrieved from the Internet, <isimile.com/PDFs/Apani_Segmentation_WP.pdf>, 8 pages.
OpenSolaris, Popuri, OpenSolaris Virtualization Technologies, Feb. 23, 2007, Retrieved from the Internet,<hub.opensolaris.org/bin/view/Community+Group+advocacy/techdays%2Darchive%2D06%2D07>, 2 pages.
International Search Report dated Aug. 19, 2009 (3 pages).
International Preliminary Report on Patentability issued in PCT/US2009/035405, Dated Sep. 10, 2010. (9 Pages).

* cited by examiner

METHOD AND SYSTEM FOR CREATING A VIRTUAL NETWORK PATH

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Controlling Network Traffic In a Blade" with U.S. application Ser. No. 11/953,832; "Method and System for Reconfiguring a Virtual Network Path" with U.S. application Ser. No. 11/953,837; "Method and System for Enforcing Resource Constraints For Virtual Machines Across Migration" with U.S. application Ser. No. 11/953,839; "Method and System for Monitoring Virtual Wires" with U.S. application Ser. No. 11/953,842 and "Method and System for Scaling Applications On A Blade Chassis" with U.S. application Ser. No. 11/953,843

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method and system for creating and managing a virtual network path between virtual machines in a network, wherein the virtual machines are located on different computers connected to a chassis interconnect.

In general, in one aspect, the invention relates to a method for creating a virtual network path. The method includes instantiating a plurality of virtual network interface cards (VNICs) for a plurality of virtual machines, wherein each of the plurality of virtual machines is located in one of a plurality of computers communicatively coupled with each other via a chassis interconnect, and wherein the plurality of computers share a physical network interface. The method further includes populating a virtual switching table associated with the plurality of VNICs, and implementing the virtual network path using the virtual switching table, wherein the virtual network path comprises a first virtual wire between a first VNIC selected from one of the plurality of VNICs and a second VNIC selected from the plurality of VNICs, wherein the first VNIC is located in a first computer selected from the plurality of computers, and wherein the second VNIC is located in a second computer selected from the plurality of computers.

In general, in one aspect, the invention relates to a system. The system includes a chassis interconnect, a physical network interface, a plurality of blades communicatively coupled with each other via the chassis interconnect, wherein the plurality of blades shares the physical network interface, wherein the plurality of blades comprises a plurality of virtual machines, and wherein the plurality of virtual machines is associated with a plurality of virtual network interface cards (VNICs). The system further includes a network express manager configured to implement a virtual network path using a virtual switching table associated with the plurality of VNICs, wherein the virtual network path comprises a first virtual wire between the physical network interface and a first VNIC selected from the plurality of VNICs, wherein the virtual network path further comprises a second virtual wire between the first VNIC and a second VNIC selected from the plurality of VNICs, wherein the first VNIC is located in a first blade selected from the plurality of blades, and wherein the second VNIC is located in a second blade selected from the plurality of blades.

In general, in one aspect, the invention relates to a computer readable medium comprising a plurality of executable instructions for creating a virtual network path, wherein the plurality of executable instructions comprises instructions to instantiate a plurality of virtual network interface cards (VNICs) for a plurality of virtual machines, wherein the plurality of virtual machines is located in a plurality of blades communicatively coupled with each other via a chassis interconnect, and wherein the plurality of blades shares a physical network interface, populate a virtual switching table associated with the plurality of VNICs, and implement the virtual network path using the virtual switching table, wherein the virtual network path comprises a first virtual wire between a first VNIC selected from the plurality of VNICs and a second VNIC selected from the plurality of VNICS, wherein the first VNIC is located in a first blade selected from the plurality of blades, and wherein the second VNIC is located in a second blade selected from the plurality of blades.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for creating a virtual network path. The virtual network path is implemented using a virtual switching table associated with virtual network interface cards (VNICs). The VNICs are associated with virtual machines, the virtual machines are located in blades, and the blades are located in a blade chassis. Specifically, the blades are communicatively coupled with each other via a chassis interconnect and share a physical network interface. The virtual network path includes one or more "virtual wires" for transmitting network traffic via the chassis interconnect. The concept of a virtual wire is discussed in detail below.

Figure 1:
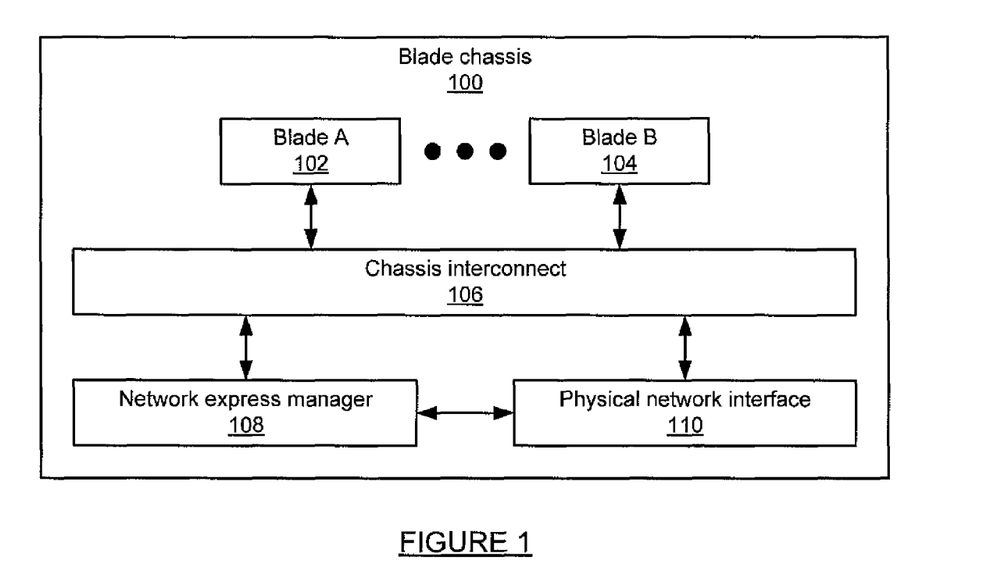
FIG. 1 shows a diagram of a blade chassis in accordance with one or more embodiments of the invention.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
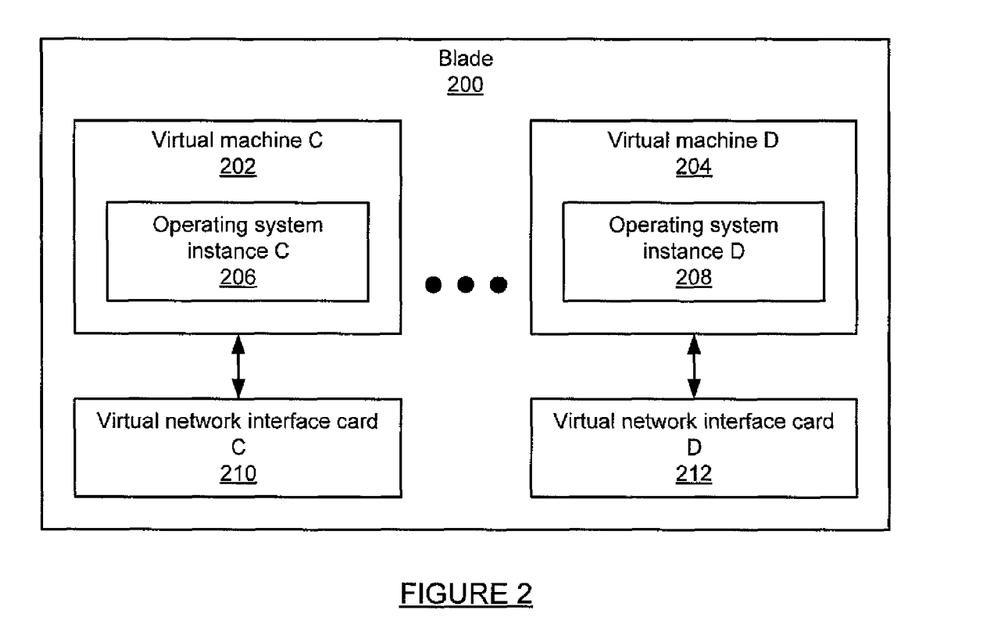
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments.

For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
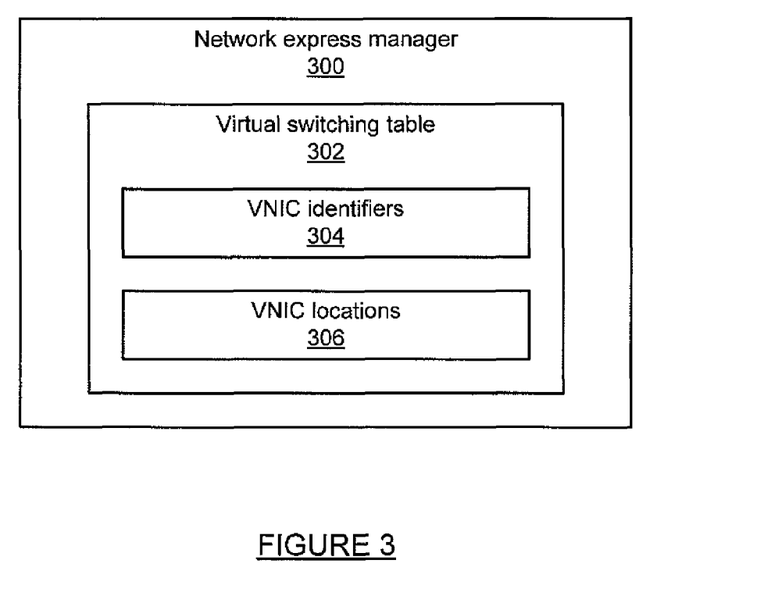
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
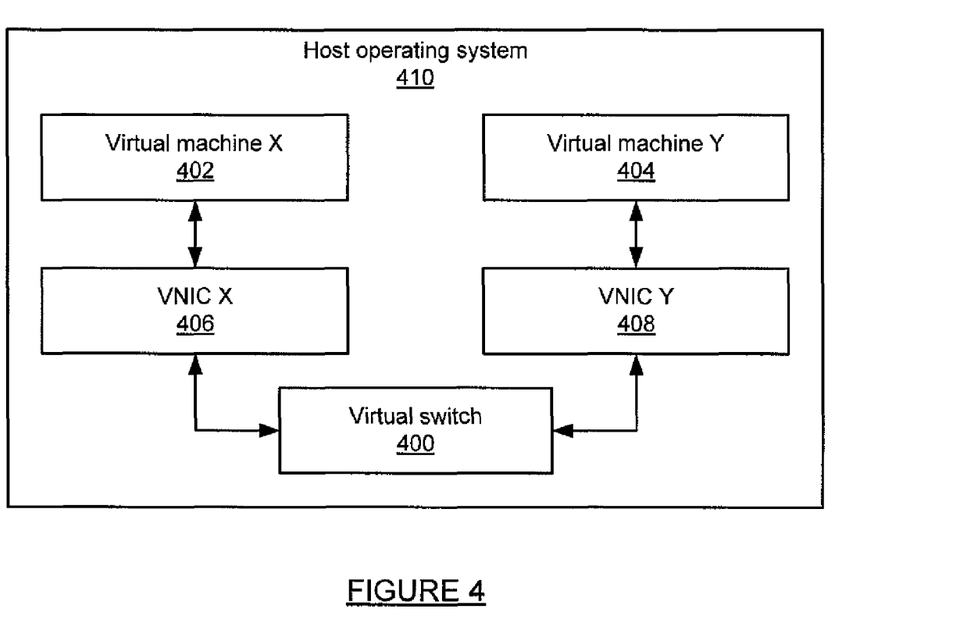
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
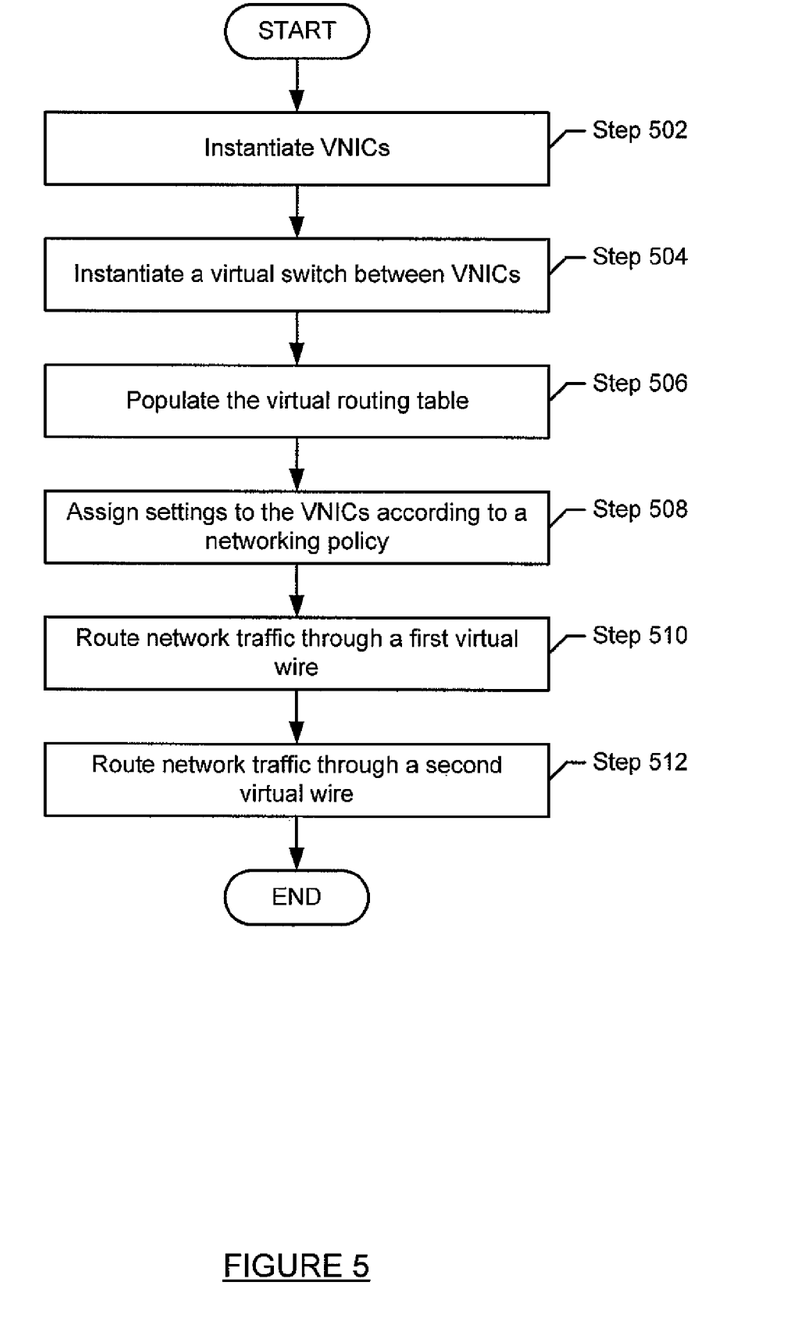
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480, 261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, Internet Protocol and/or Media Access Control (MAC) addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves routing the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
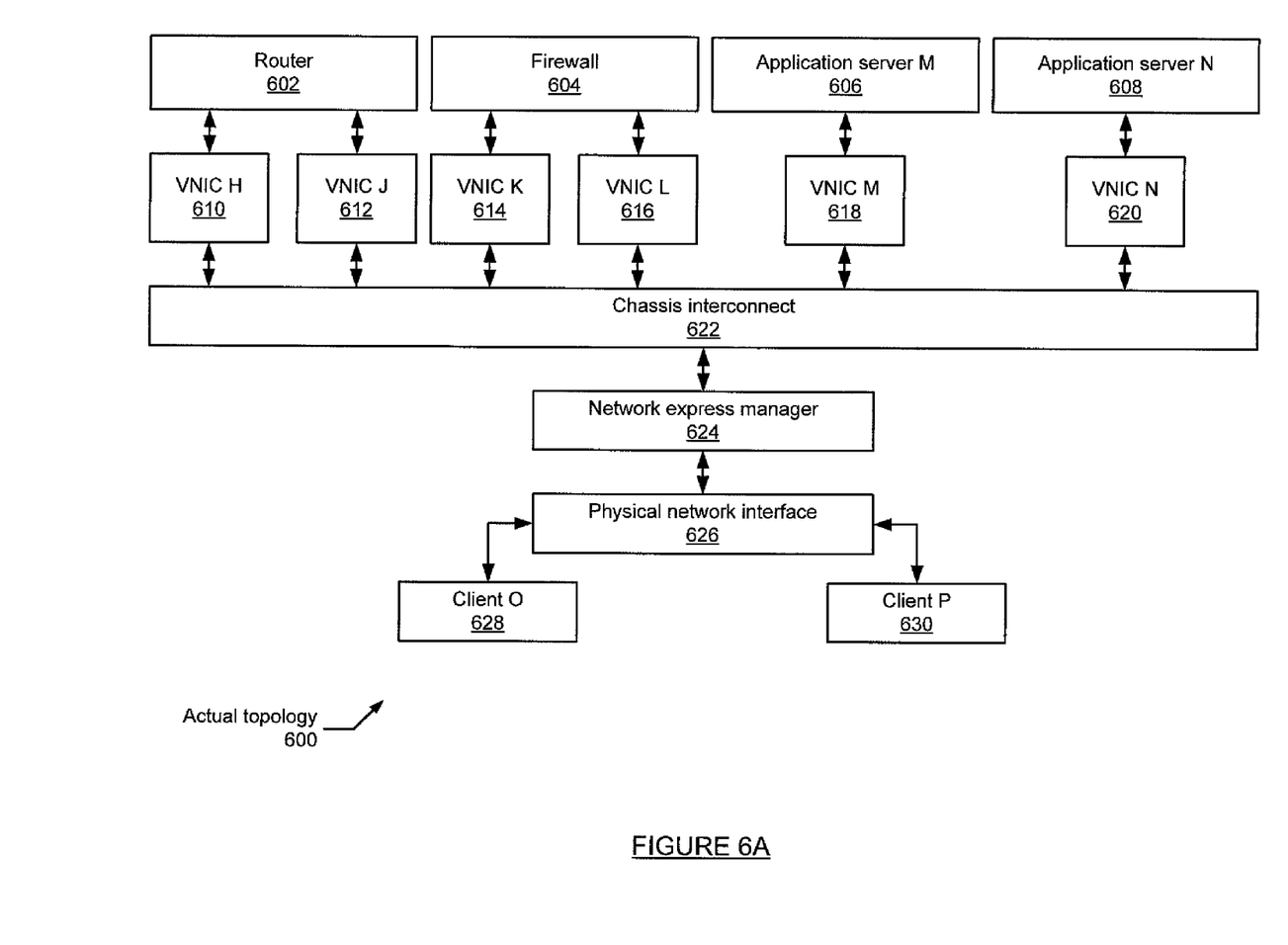
FIGS. 6A-6C show an example of creating virtual network paths in accordance with one or more embodiments of the invention.
Figure 6B:
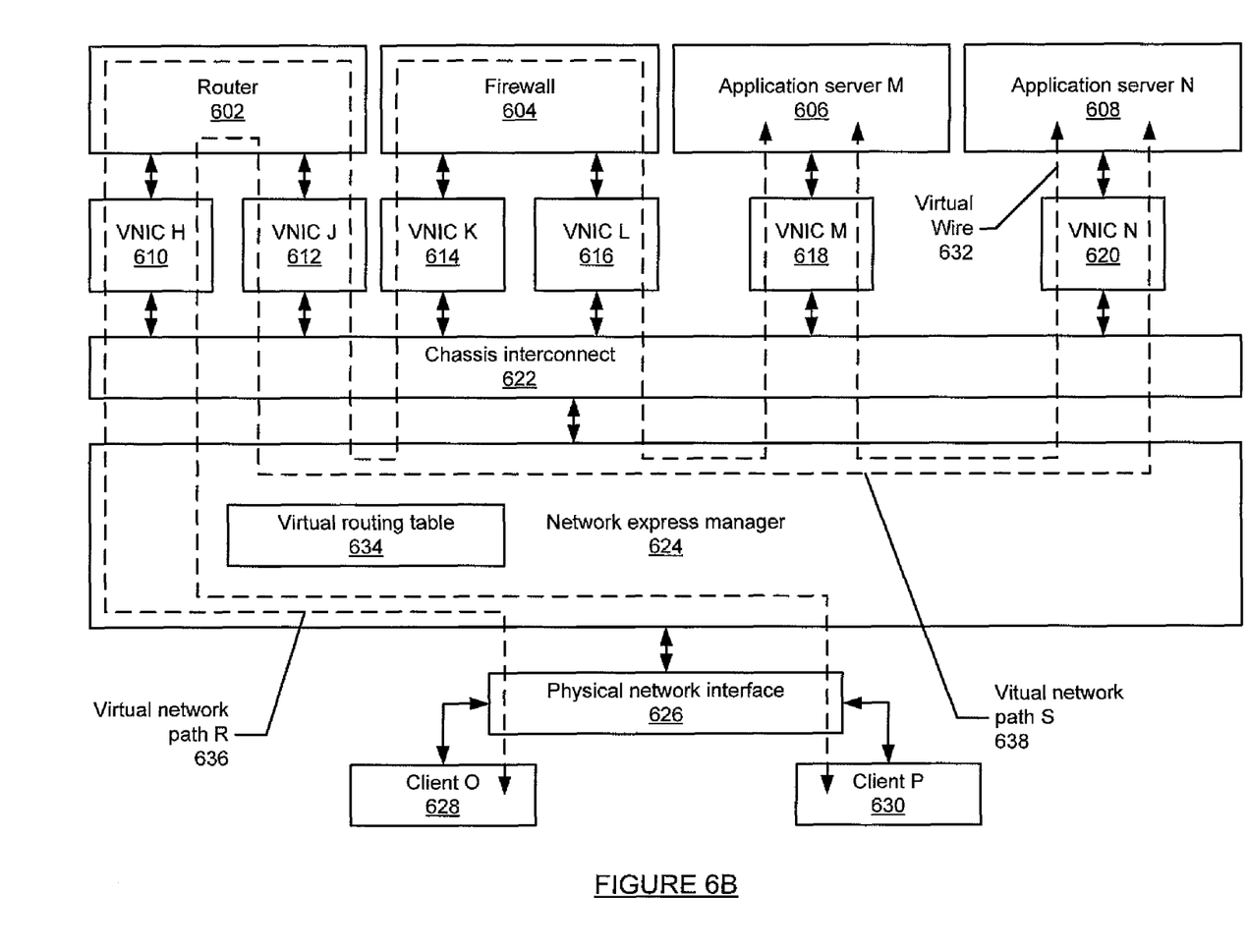
Figure 6C:
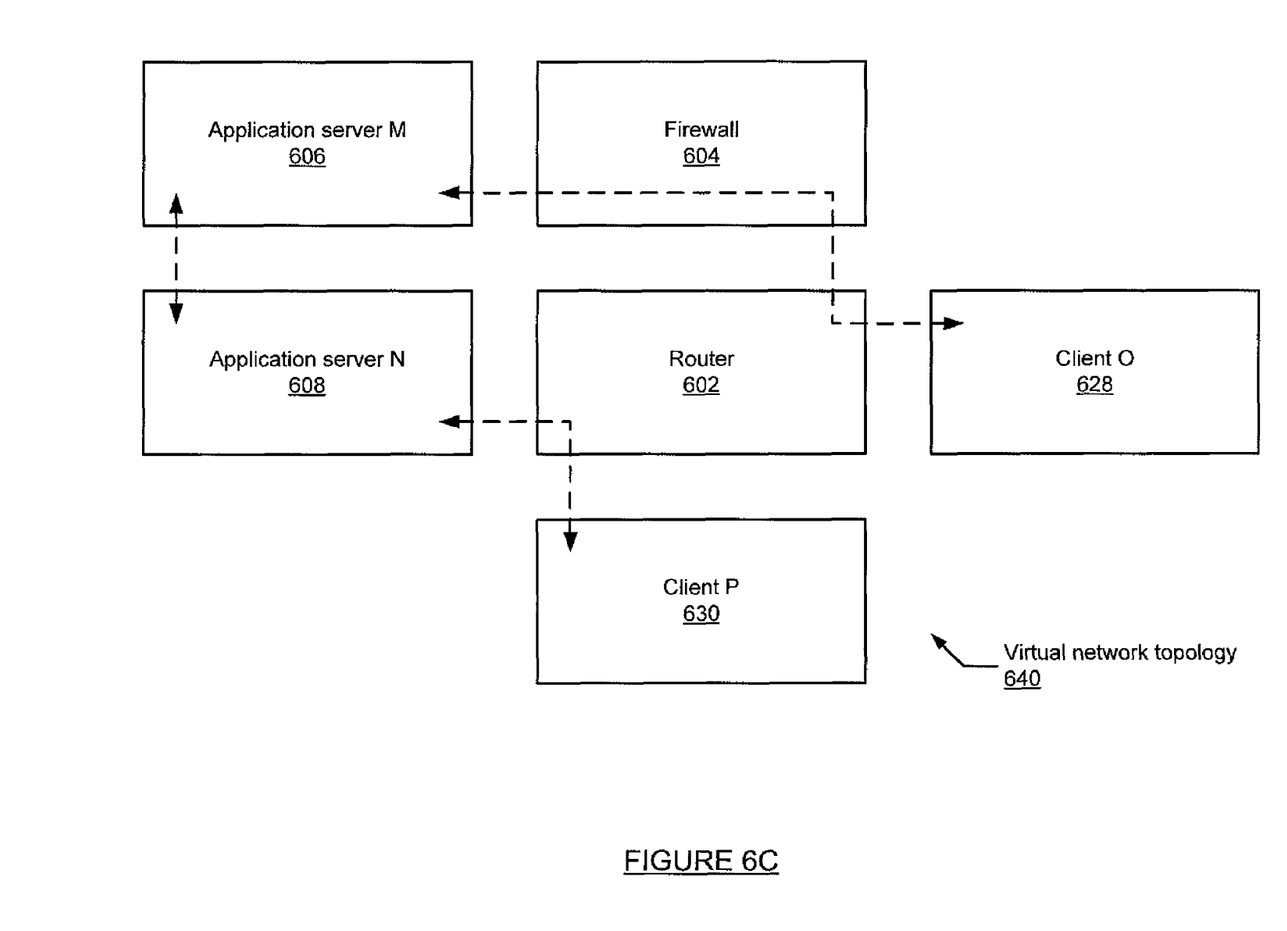

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected, FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be though of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and routing network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a virtual network path, compromising:
   instantiating a first virtual network interface card (VNIC) for a first virtual machine, wherein the first VNIC and the first virtual machine are located in a first blade of a blade chassis;
   instantiating a second VNIC for second virtual machine, wherein the second VNIC and the second virtual machine are located in a second blade of the blade chassis, wherein the first blade and the second blade are communicatively coupled with each other via a chassis interconnect of the blade chassis, wherein the chassis interconnect comprises a Peripheral Component Interface Express (PCI-E) backplane comprising a plurality of PCI-E endpoints, wherein the first blade connects to the blade chassis using a first PCI-E endpoint from the plurity of PCI-E endpoints, wherein the second blade connects to the blade chassis using a second PCI-E endpoint from the plurality of PCI-E endpoints, and wherein the first blade and the second blade share a physical network interface;
   populating a virtual switching table associated with the first VNIC and the second VNIC, wherein the virtual switching table comprises a first mapping of a first Internet Protocol (IP) address for the first VNIC to the first PCI-E endpoint, and wherein the virtual switching table further comprises a second mapping of a second IP address for the second VNIC to the second PCI-E endpoint; and
   implementing the virtual network path using the virtual switching table,
      wherein the virtual network path comprises a first virtual wire for sending packets from the first VNIC to the second VNIC.

2. The method of claim 1, further comprising:
   assigning settings to the first VNIC and the second VNIC according to a networking policy, wherein the networking policy comprises at least one selected from the group consisting of bandwidth provisioning and network traffic classification.

3. The method of claim 1, further comprising:
   instantiating a virtual switch between the second VNIC and a third VNIC located in the second blade,
   wherein the virtual switch allows communication between the second VNIC and the third VNIC independent of the chassis interconnect.

4. The method of claim 1, wherein the first virtual machine comprises at least one selected from a group consisting of a switch, a router, a firewall, a load balancer, and an application server.

5. The method of claim 1, wherein the virtual network path further comprises a second virtual wire between the physical network interface and the first VNIC.

6. A system comprising:
   a blade chassis, comprising:
      a chassis interconnect, comprising a Peripheral Component Interface Express (PCI-E) backplane, wherein the PCI-E backplane comprises a plurality of PCI-E endpoints; and
      a network express manager, comprising a virtual switching table;
   a physical network interface;
   a first blade and a second blade communicatively coupled with each other via the chassis interconnect,
      wherein the first and second blades share the physical network interface,
      wherein the first blade comprises a first virtual machine and a first virtual network interface card (VNIC) associated with the first virtual machine, wherein the first blade connects to the blade chassis using a first PCI-E endpoint from the plurality of PCI-E endpoints,
      wherein the second blade comprises a second virtual machine and a second VNIC associated with the second virtual machine, wherein the second blade connects to the blade chassis using a second PCI-E endpoint from the plurality of PCI-E endpoints,
   wherein the virtual switching table comprises a first mapping of a first Internet Protocol (IP) address for the first VNIC to the first PCI-E endpoint, and wherein the virtual switching table further comprises a second mapping of a second IP address for the second VNIC to the second PCI-E endpoint, wherein the network express manager is configured to implement a virtual network path using the virtual switching table, wherein the virtual network path comprises a first virtual wire for sending packets between the physical network interface and the first VNIC, wherein the virtual network path further comprises a second virtual wire for sending packets between the first VNIC and the second VNIC.

7. The system of claim 6, wherein the network express manager is further configured to:

assign settings to the first and second VNICs according to a networking policy.

8. The system of claim 7, wherein the networking policy comprises at least one selected from the group consisting of bandwidth provisioning and network traffic classification.

9. The system of claim 7, wherein the networking policy comprises an identical bandwidth limit for the first virtual wire and the second virtual wire.

10. The system of claim 6, wherein the virtual network path further comprises a virtual switch between the second VNIC and a third VNIC located in the second blade, wherein the virtual switch comprises a communications path between the second VNIC and the third VNIC independent of the chassis interconnect.

11. The system of claim 6, wherein the first virtual machine comprises at least one selected from a group consisting of a switch, a router, a firewall, a load balancer, and an application server.

12. A computer readable storage medium comprising a plurality of executable instructions for creating a virtual network path, wherein the plurality of executable instructions comprises instructions to:

instantiate a first virtual network interface card (VNIC) for a first virtual machine, wherein the first VNIC and the first virtual machine are located in a first blade of a blade chassis;

instantiate a second VNIC for a second virtual machine, wherein the second VNIC and the second virtual machine are located in a second blade of the blade chassis, wherein the first blade and the second blade are communicatively coupled with each other via a chassis interconnect of the blade chassis, wherein the chassis interconnect comprises a Peripheral Component Interface Express (PCI-E) backplane comprising a plurality of PCI-E endpoints, wherein the first blade connects to the blade chassis using a first PCI-E endpoint from the plurality of PCI-E endpoints, wherein the second blade connects to the blade chassis using a second PCI-E endpoint from the plurality of PCI-E endpoints, and wherein the first blade and the second blade share a physical network interface;

populate a virtual switching table associated with the first VNIC and the second VNIC, wherein the virtual switching table comprises a first mapping of a first Internet Protocol (IP) address for the first VNIC to the first PCI-E endpoint, and wherein the virtual switching table further comprises a second mapping of a second IP address for the second VNIC to the second PCI-E endpoint; and implement the virtual network path using the virtual switching table, wherein the virtual network path comprises a first virtual wire for sending packets from the first VNIC to the second VNIC.

13. The computer readable storage medium of claim 12, wherein the plurality of executable instructions further comprises instructions to:

assign settings to the first and second VNICs according to a networking policy.

14. The computer readable storage medium of claim 13, wherein the networking policy comprises at least one selected from the group consisting of bandwidth provisioning and network traffic classification.

15. The computer readable storage medium of claim 12, wherein the plurality of executable instruction further comprises instructions to:

instantiate a virtual switch between the second VNIC and a third VNIC located in the second blade, and wherein the virtual switch allows communication between the second VNIC and the third VNIC independent of the chassis interconnect.

16. The computer readable storage medium of claim 12, wherein the virtual network path further comprises a second virtual wire between the physical network interface and the first VNIC.

\* \* \* \* \*

UNITED STATES PATENT AND TRADEMARK OFFICE
CERTIFICATE OF CORRECTION

| | | |
|---|---|---|
| PATENT NO. | : 7,945,647 B2 | Page 1 of 1 |
| APPLICATION NO. | : 11/953829 | |
| DATED | : May 17, 2011 | |
| INVENTOR(S) | : Sunay Tripathi | |

It is certified that error appears in the above-identified patent and that said Letters Patent is hereby corrected as shown below:

In claim 1, column 10, line number 5, the word "plurity" should read --plurality--.

Signed and Sealed this
Sixteenth Day of August, 2011

David J. Kappos
*Director of the United States Patent and Trademark Office*